July 25, 1961  E. E. TEMPLE ET AL  2,993,522
PIPE FLARING TOOL

Filed June 29, 1959  4 Sheets-Sheet 1

INVENTORS
ERNEST E. TEMPLE
AND ROBERT TEMPLE
BY Brown, Critchlow, Flick & Peckham
THEIR ATTORNEYS INVENTORS
ERNEST E. TEMPLE
AND ROBERT TEMPLE
BY
Brown, Critchlow, Flick & Peckham

THEIR ATTORNEYS

INVENTORS
ERNEST E. TEMPLE
AND ROBERT TEMPLE
BY
THEIR ATTORNEYS.

July 25, 1961 E. E. TEMPLE ET AL 2,993,522
PIPE FLARING TOOL

Filed June 29, 1959 4 Sheets-Sheet 4

INVENTORS
ERNEST E. TEMPLE
AND ROBERT TEMPLE
BY
Brown, Critchlow, Filieb & Peckham

THEIR ATTORNEYS

United States Patent Office 2,993,522
Patented July 25, 1961

2,993,522
PIPE FLARING TOOL
Ernest E. Temple, Murrysville, and Robert Temple, Swissvale, Pa., assignors to Mine Safety Appliances Company, Pittsburgh, Pa., a corporation of Pennsylvania
Filed June 29, 1959, Ser. No. 823,729
12 Claims. (Cl. 153—79)

This invention relates to tools for flaring the ends of pipes, and more particularly to such tools that are actuated by explosive charges.

It is among the objects of this invention to provide a pipe flaring tool which will form extremely accurate flared ends on pipes, which will flare all pipes of the same size uniformly, which is compact and easy to use, and which exerts a great deal of pressure instantaneously.

In accordance with this invention a die is provided with a central pipe-receiving opening that flares at its rear end. The die has outer surfaces converging toward its opposite end. The rear end of the die is engaged by the front end of sleeve means disposed in a holder that is connected with a retaining member which contains the die. The retaining member is provided with a pipe-receiving opening in front of the die opening and with forwardly converging inner surfaces engaging the converging surfaces of the die. The die is separated into spaced segments which are slidable forward against the retaining member surfaces. The holder has a barrel slidably receiving the sleeve means and it also has a cartridge chamber at the rear end of the sleeve means. The holder is adjustable for moving the cartridge chamber and retaining member toward and away from each other and is formed to push the sleeve means forward against the die to cause the die to grip the end of a pipe in the die opening. At the rear end of the die there is pipe-flaring means, behind which a piston is disposed in the sleeve means. A cartridge can be fired in the cartridge chamber in order to drive the sleeve means and piston forward. The piston drives the flaring means forward to expand the end of the pipe into the flared end of the die opening.

The invention is illustrated in the accompanying drawings, in which

Figure 1:
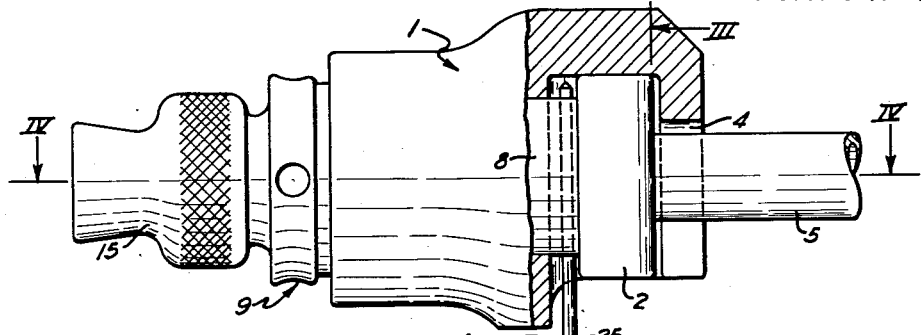
Figure 2:
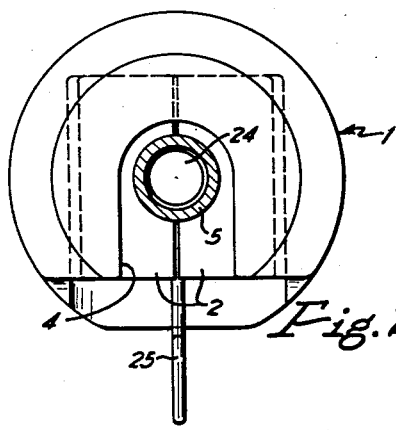
Figure 3:
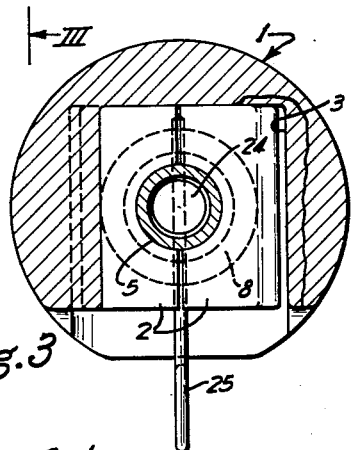
Figure 4:
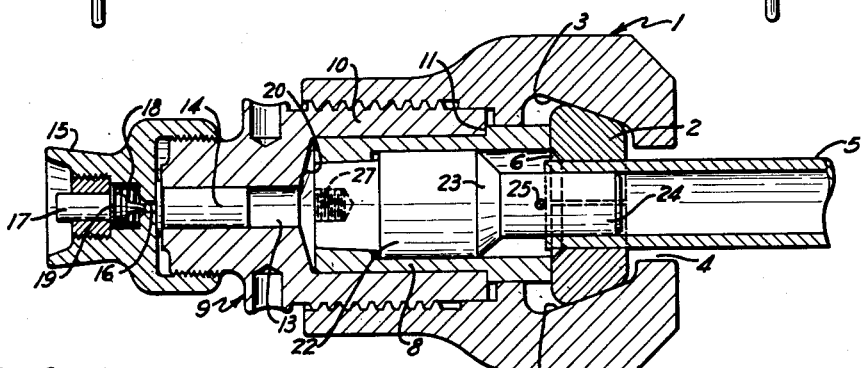
Figure 5:
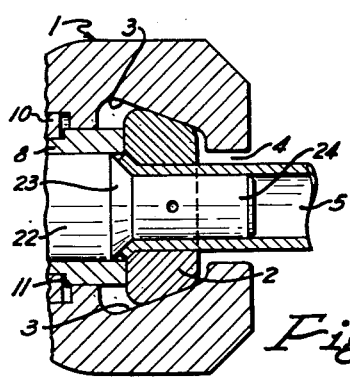
Figure 6:
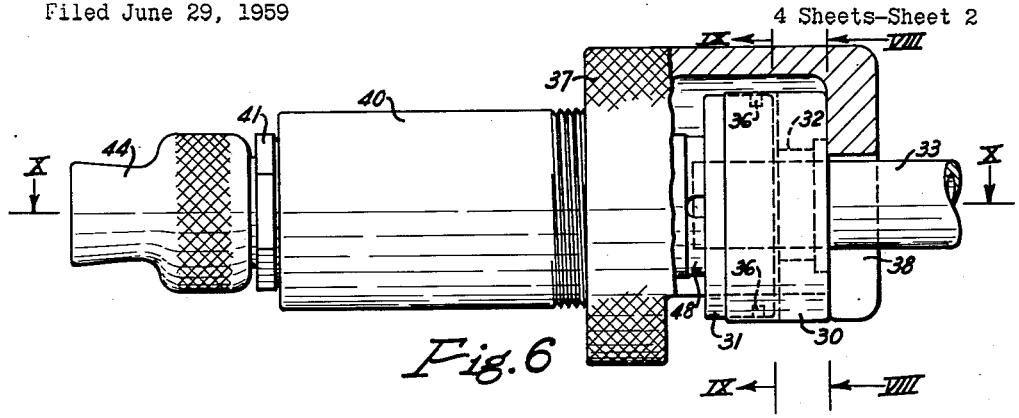
Figure 7:
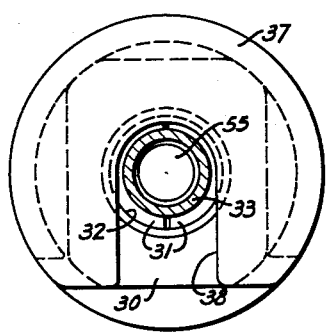
Figure 8:
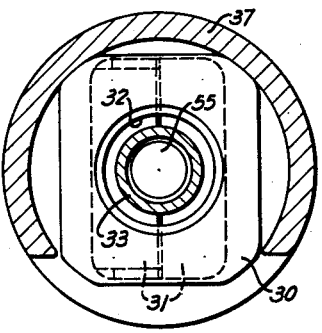
Figure 9:
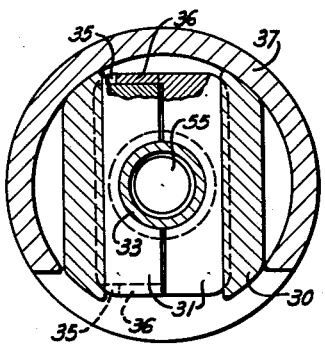
Figure 10:
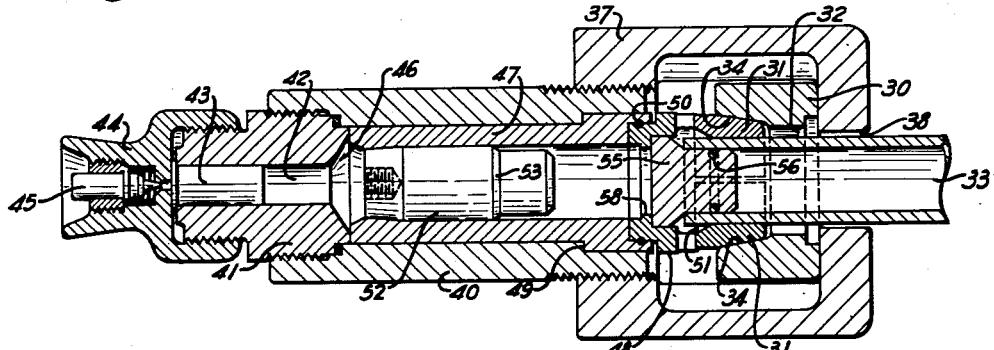
Figure 11:
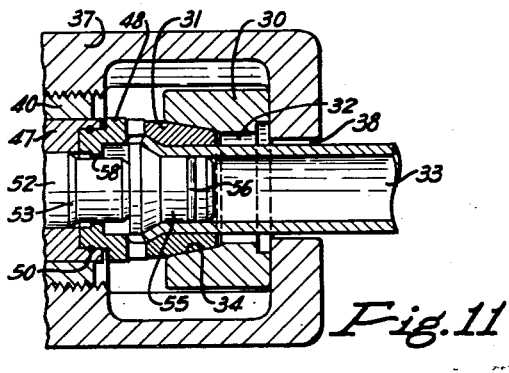
Figure 12:
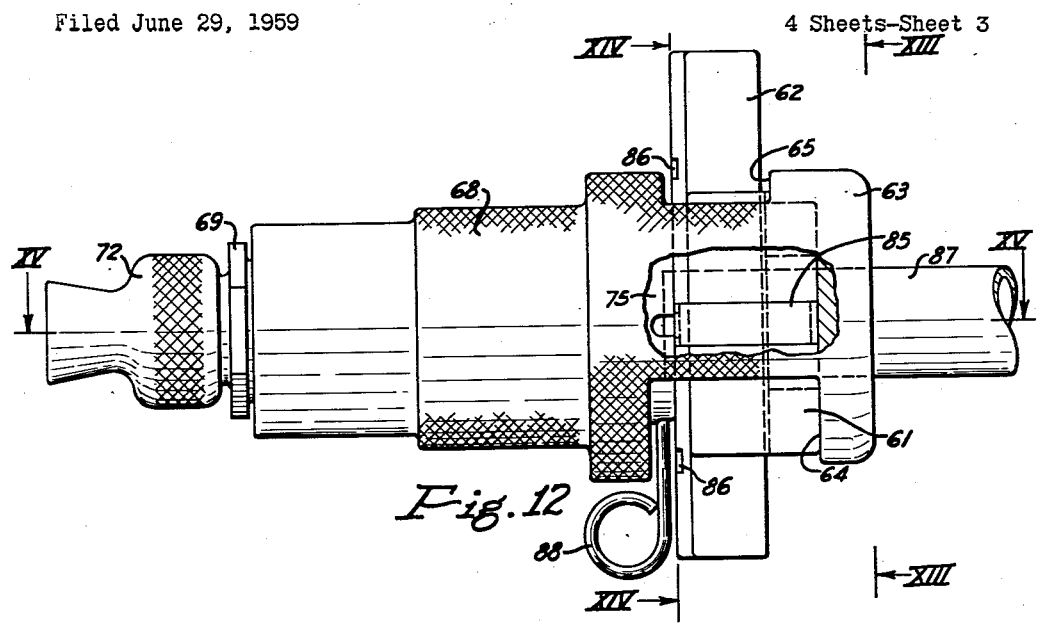
Figure 13:
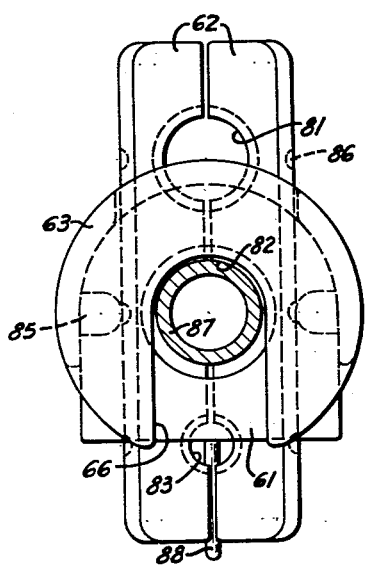
Figure 14:
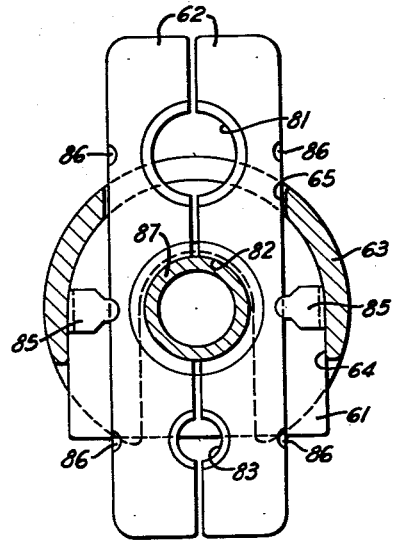

FIG. 1 is a side view of a pipe flaring tool with the front of it broken away in section;
FIG. 2 is a view of the front end of the tool;
FIG. 3 is a cross section on line III—III of FIG. 1;
FIG. 4 is a longitudinal section on line IV—IV of FIG. 1;
FIG. 5 is a fragmentary longitudinal section showing a pipe flared in the die;
FIG. 6 is a view similar to FIG. 1 of a modification;
FIG. 7 is a view of the front of the tool shown in FIG. 6;
FIGS. 8 and 9 are cross sections taken on the lines VIII—VIII and IX—IX, respectively, of FIG. 6;
FIG. 10 is a longitudinal section on line X—X of FIG. 6;
FIG. 11 is a fragmentary longitudinal section showing a pipe flared in the die; and
FIGS. 12 to 16 are views similar to FIGS. 1 to 5 of a further embodiment of the invention.

Referring to the first four figures of the drawings, the main body of the pipe flaring tool is a housing 1 that serves as a retaining member for a die 2. The housing is hollow and has an internally threaded tubular rear end that merges into the die-retaining portion, which is open at one side to permit the die to be inserted and removed. The chamber that receives the die is rectangular in cross section, but has forwardly converging side walls 3, as shown in FIG. 4. The front end wall of the die chamber is provided with a central opening 4 that extends laterally through the same side of the housing as the chamber to permit a pipe 5 to be inserted laterally into the housing. Removably mounted in the housing chamber is the die, which is provided with a central pipe-receiving opening, the rear end 6 of which is flared to the extent necessary to provide the desired flare on a pipe. To permit the die to grip the pipe, as will be explained presently, and also to allow the die to be removed from the flared pipe, the die is made in two parts or segments which are spaced apart along its center as shown in FIGS. 2 and 3.

After the two segments of the die have been applied to the end of a pipe that is to be flared and the assembly inserted in the housing chamber, the forwardly converging outer surfaces of the die are pressed forward against the adjoining side walls 3 of the housing chamber by sleeve means engaging the back of the die around its opening 6. As shown in FIG. 4, the sleeve means may take the form of an integral sleeve 8, the major portion of which is slidably mounted in a holder 9 screwed into the rear end of the housing. The front portion of the holder is in the form of a barrel 10 that receives the sleeve, and the front end of the barrel engages a rearwardly facing annular shoulder 11 on the sleeve. Consequently, when the barrel is screwed forward into the housing, the sleeve will press the die against the inclined walls of the housing chamber and thereby force the two segments of the die toward each other to hold them against the pipe between them.

The portion of holder 9 projecting from the rear end of the housing is provided with an axial bore 13 that serves as a chamber for an explosive cartridge 14, which is held in place by a breechblock 15 screwed onto the rear end of the holder. The breechblock likewise is provided with an axial bore 16, in which a firing pin 17 is slidably mounted. The central portion of the bore is enlarged and contains a coil spring 18 that presses a collar 19 on the pin backward so that the point of the pin normally is retracted into the bore and the rear end of the pin projects from the rear end of the bore. The front end of the cartridge chamber is in communication with the rear end of the sleeve, preferably by means of a small chamber 20 behind the sleeve.

Slidably mounted inside the sleeve is a piston 22, which may be provided with a tapered rear end normally wedged in the tapered rear end of the sleeve to hold the piston in retracted position. In front of the piston there is pipe-flaring means spaced from the die. This means may be a separate element or, as shown, a forwardly tapered portion 23 of the front end of the piston itself. Extending forward from the center of the flaring means is an integral cylindrical member 24, which extends into the die and fits the inside of the pipe. This member is provided with a transverse bore aligned with holes in the opposite sides of the front end of the sleeve for receiving a removable pin 25 FIG. (1) that serves as a stop or locator for the pipe. That is, the pipe is pushed back through the die until it engages the pin, so the same length of every pipe will be flared. After the pipe has been positioned in this manner and gripped by the die segments, the pin is removed.

When all is in readiness, the rear end of the firing pin is struck by a hammer or the like, which detonates the cartridge. The resulting gases expand against the rear ends of the sleeve and piston to drive them both forward. Since the sleeve is already in engagement with the die but flaring means 23 is spaced from the die, the first thing that will occur is that the die will be driven forward slightly and thereby caused to grip the pipe so securely that the pipe will not be driven forward through the die when struck immediately thereafter by the flaring means. Consequently, as shown in FIG. 5, the rear end of the pipe will be expanded or flared into the flared rear end of the die opening. Cylindrical member 24 serves as a mandrel to support the pipe against contraction by the die segments. The breechblock and cartridge case then are removed from sleeve holder 10, which is then unscrewed from the housing far enough to permit member 24 to be withdrawn from the pipe. The withdrawal is effected by first inserting a rod (not shown) through the cartridge chamber and screwing it into a threaded opening 27 in the rear end of the piston. Then the rod is pulled to retract the piston and to wedge it in the tapered rear end of the sleeve. Then the pipe and die are removed laterally from the housing and to two parts of the die are separated and removed from the flared pipe.

In the modification shown in FIG. 6 and the following five figures, the retainer 30 for the split die 31 is rectangular and provided with a central opening 32 for receiving the pipe 33 to be flared. As shown in FIG. 10, the rear portion of the retainer is provided with a recess having opposed forwardly converging side walls 34 engaged by the forwardly converging sides of the die. To help hold the two segments of the die in proper relation to each other, the ends of one of the segments may be provided with transverse slots 35, as shown in FIG. 9, in which lateral projections 36 on the other segments slide. The retainer is removably held in a hollow cylindrical housing 37 that is open at one side and that has an open sided pipe-receiving opening 38 in its front wall. The rear end of the housing has a central threaded opening, in which is threaded the front end of the barrel 40 of a sleeve holder. The rear end of the barrel is internally threaded to receive a plug 41 provided centrally with a cartridge chamber 42 that contains a cartridge 43 held in place by a breechblock 44 screwed on the rear end of the plug. The breechblock is provided with a firing pin 45 in the same manner as the block shown in FIG. 4. The front end of the cartridge chamber flares out to form a small chamber 46.

The sleeve means supported by the barrel include a sleeve 47 slidably mounted in the barrel, and a stop ring 48 removably connected to the front end of the sleeve. The front portion of the sleeve is provided outside with a rearwardly facing annular shoulder 49 normally engaged by a corresponding shoulder in the barrel so that the sleeve can be moved ahead by the barrel. The front end of the sleeve is recessed to receive the rear end of the stop ring, which may be held in place by a retaining ring 50. The front of the stop ring engages the back of the die around the flared rear end 51 of the die opening. Slidably mounted in the sleeve is a piston 52 that has a tapered rear end normally wedged in the tapered rear end of the sleeve. The piston also has a front portion of reduced diameter connected to the rest of the piston by a shoulder 53.

In this form of the invention the pipe-flaring means is a separate member in the form of a plunger 55 that has a rearwardly flaring rear portion that seats in stop ring 48, which holds it against the end of the pipe. The plunger also has a forwardly projecting cylindrical portion of reduced diameter that fits in the pipe. This cylindrical portion may be provided with an annular groove containing a friction ring 56 to hold the plunger in the pipe while the tool is being assembled.

To prepare the tool for operation, one end of the pipe 33 is projected through the die retainer 30 and the two part die is applied to it. Then plunger 55 is inserted in the end of the pipe and this assembly is inserted in the housing chamber, from which stop ring 48 has been removed by retracting the sleeve holder relative to housing 37. The holder then is screwed forward again to cause the stop ring to engage the back of the die and hold it snugly against the inclined side walls 34 of the retainer recess. At the same time, the stop ring will hold the plunger against the end of the pipe and insure that just the correct length of pipe will project from the die. When the cartridge is fired, the sleeve and piston will be driven forward, but before the piston strikes the flaring plunger, the sleeve will force the stop ring so tightly against the die that the die will securely grip the pipe around the front part of the plunger and prevent it from being driven forward by the plunger. Consequently, the plunger will flare the rear end of the pipe into the flared opening 51 of the die, as shown in FIG. 11.

The sleeve holder barrel then is turned to permit the stop ring to be retracted so that the die, its retainer and the plunger and flared pipe can be removed laterally from the housing. The retainer is then moved forward to release the die segments, which are then removed from the pipe followed by the retainer. The punch then is removed from the pipe.

To avoid discharge of the piston from the tool in case it is fired accidentally when the pipe and plunger are not in place, the inside of the stop ring is provided with a shoulder 58 that will be struck by the shoulder 53 on the piston to thereby stop the piston.

Figure 15:
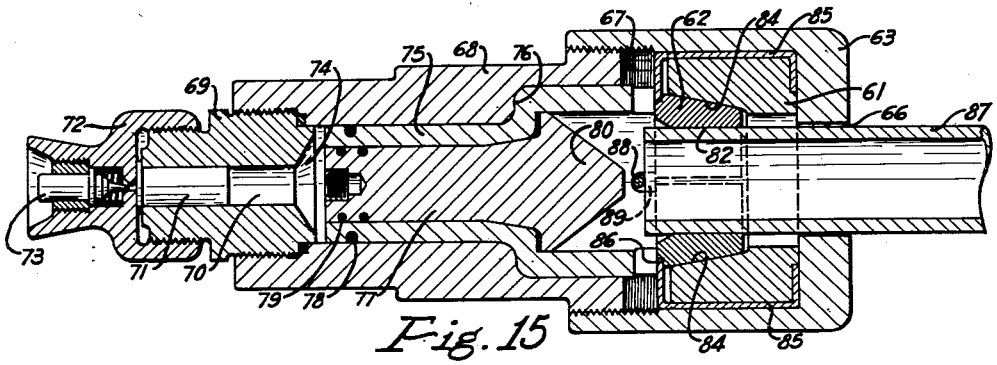

In the embodiment of the invention shown in FIGS. 12 to 16, the retainer 61 for the split die 62 fits in a hollow cylindrical housing 63 that has a large opening 64 at one side for insertion and removal of the retainer, and a smaller opening 65 at the opposite side to receive a projecting portion of the die. The housing also has an open sided pipe-receiving opening 66 in its front wall, and a central threaded opening 67 in its rear end, in which is threaded the front end of the barrel 68 of a sleeve holder. As shown in FIG. 15, the rear end of the barrel is threaded internally to receive a plug 69 that is provided with a central cartridge chamber 70 containing a cartridge 71 held in place by a breechblock 72 screwed on the rear end of the plug. The breechblock is provided with a firing pin 73 in the same manner as the blocks previously described. The front end of the cartridge chamber flares out to form a small chamber 74 behind a sleeve 75 slidably mounted in the barrel.

The inner diameter of the barrel near its front end is enlarged, and the front end portion of the sleeve is enlarged by a corresponding amount so that radial shoulders 76 are formed, by which the sleeve can be moved ahead by the barrel when it is screwed farther into housing 63. Slidably mounted in the sleeve is a piston 77 that has a rearwardly tapered front end normally wedged in a correspondingly tapered central portion of the sleeve to hold the piston in its rear position. To provide a better seal at the rear end of the sleeve and piston, tthey may be provided with annular grooves, in which O rings 78 and 79 are mounted. The tube flaring means is in the form of a forwardly tapered head 80 that may be integral with the front end of the piston. It is located in the large front end of the sleeve.

The die 62 is elongated considerably to provide room for two or more spaced parallel openings 81, 82, and 83 of different sizes, each of which has a flared rear end to provide the desired flare on a pipe. The rear portion of the retainer is provided with a recess having opposed forwardly converging side walls 84 engaged by the forwardly converging sides of the die. Any one of the three openings in the die can be located coaxially with the piston and flaring means 80 by sliding the die one way or the other across housing 63, and then inserting resilient clips 85 in notches 86 in opposite sides of the die. Prefeably, the clips are held by the housing in channels in the opposite sides of the retainer and are provided with inwardly projecting rear ends shaped to fit snugly in a pair of the notches at opposite sides of any die opening. The die will be adjusted to its desired position in the retainer before the clips are applied and the unit inserted in the housing.

Figure 16:
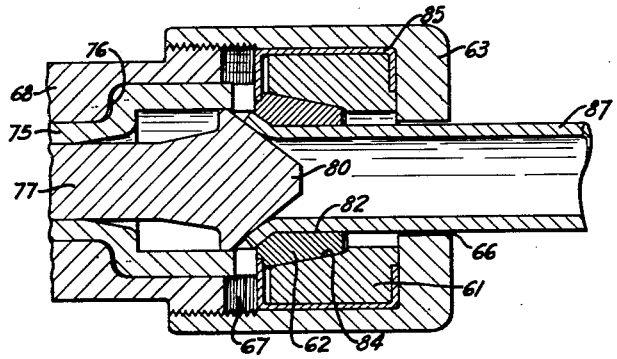

The distance that the pipe 87 can project from the rear end of the die is controlled by a removable pin 88 extending through notches 89 in opposite sides of the front end of sleeve 75. The pin assures that the same length of pipe will be flared every time. Before the tool is used, the pin is removed. The operation of this tool is the same as that of those previously described. When the cartridge is fired, the sleeve moves ahead slightly to cause the split die to firmly grip the pipe, and immediately thereafter the end of the pipe will be flared as shown in FIG. 16.

It will be seen then in each embodiment of the invention the die is moved ahead a moment before the pipe is struck by the flaring means, so the pipe is firmly gripped during the flaring operation. Both operations are performed by the same explosion.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A pipe flaring tool comprising a die provided with a central pipe-receiving opening flaring at its rear end, the die having outer surfaces converging toward its opposite end, sleeve means having a front end engageable with the back of the die, a retaining member enclosing the die and provided with a pipe-receiving opening in front of said die opening and with forwardly converging inner surfaces engaging said surfaces of the die, the die being separated into spaced segments slidable forward against said retaining member surfaces, a holder for said sleeve means connected with the retaining member and having a barrel slidably receiving the sleeve means and having a cartridge chamber at the rear end of said means in communication therewith, said holder being adjustable for moving said cartridge chamber and retaining member toward and away from each other and being formed to push said sleeve means forward against said die to cause the die to grip the end of a pipe in the die opening, the tool being provided with an expansion chamber between the cartridge chamber and the adjoining end of said sleeve means, pipe-flaring means behind the die and normally spaced therefrom, a piston in said sleeve means behind said flaring means, and means associated with said cartridge chamber for firing a cartridge to drive the sleeve means and piston forward, the piston driving said flaring means forward to expand the end of the pipe into the flared end of the die opening.

2. A pipe flaring tool comprising a die provided with a central pipe-receiving opening flaring at its rear end, the die having outer surfaces converging toward its opposite end, sleeve means having a front end engageable with the back of the die, a retaining member enclosing the die and provided with a pipe-receiving opening in front of said die opening and with forwardly converging inner surfaces engaging said surfaces of the die, the die being separated into spaced segments slidable forward against said retaining member surfaces, a holder for said sleeve means connected with the retaining member and having a barrel slidably receiving the sleeve means and having a cartridge chamber at the rear end of said means in communication therewith, said holder being adjustable for moving said cartridge chamber and retaining member toward and away from each other, the sleeve means being provided with a rearwardly facing external annular shoulder engaged by said barrel for pushing said means forward against said die to cause the die to grip the end of a pipe in the die opening, the tool being provided with an expansion chamber between the cartridge chamber and the adjoining end of said sleeve means, pipe-flaring means behind the die and normally spaced therefrom, a piston in said sleeve means behind said flaring means, and means associated with said cartridge chamber for firing a cartridge to drive the sleeve means and piston forward, the piston driving said flaring means forward to expand the end of the pipe into the flared end of the die opening.

3. A pipe flaring tool according to claim 1, in which said barrel is screwed into the back of said retaining member.

4. A pipe flaring tool according to claim 1, in which the piston and the inside of said sleeve means are provided with rearwardly tapered areas normally wedging them together.

5. A pipe flaring tool according to claim 1, in which said pipe flaring means is integral with the piston and normally spaced from the die and is provided with a cylindrical portion extending forward into the die, the diameter of said cylindrical portion being substantially equal to the inner diameter of the pipe being flared.

6. A pipe flaring tool according to claim 1, in which a removable tube-positioning pin extends transversely through said sleeve means a short distance behind the die.

7. A pipe flaring tool according to claim 1, in which said retaining member is provided with a lateral opening for insertion and removal of the die.

8. A pipe flaring tool according to claim 1, in which said pipe-flaring means is a plunger spaced from the piston and having a cylindrical portion adapted to fit in the end of the pipe in the die, and a rearwardly flaring portion for flaring the pipe when the plunger is struck by the piston.

9. A pipe flaring tool according to claim 8, in which said sleeve means includes a sleeve and a removable ring disposed between the sleeve and die, the ring being provided behind said plunger with an internal shoulder of smaller internal diameter than the sleeve.

10. A pipe flaring tool comprising a die provided with a central pipe-receiving opening flaring at its rear end, the die having outer surfaces converging toward its opposite end, sleeve means having a front end engageable with the back of the die, a retaining member enclosing the die and provided with a pipe-receiving opening in front of said die opening and with forwardly converging inner surfaces engaging said surfaces of the die, the die being separated into spaced segments slidable forward against said retaining member surfaces, a hollow housing enclosing the die and retaining member and having a pipe-receiving opening in its front and another opening in its back, a holder for said sleeve means connected with the back of said housing around its back opening and having a barrel slidably receiving the sleeve means and having a cartridge chamber at the rear end of said means in communication therewith, said holder being adjustable for moving said cartridge chamber and housing toward and away from each other and being formed to push said sleeve means forward against said die to cause the die to grip the end of a pipe in the die opening, the tool being provided with an expansion chamber between the cartridge chamber and the adjoining end of said sleeve means, pipe-flaring means behind the die and normally spaced therefrom, a piston in said sleeve means behind said flaring means, and means associated with said cartridge chamber for firing a cartridge to drive the sleeve means and piston forward, the piston driving said flaring means forward to expand the end of the pipe into the flared end of the die opening.

11. A pipe flaring tool comprising a die provided with a plurality of parallel pipe-receiving openings flaring at its rear end, the die having outer surfaces converging toward its opposite end, sleeve means having a front end engageable with the back of the die, a retaining member enclosing the die and provided with a pipe-receiving opening coaxial with said sleeve means and having forwardly converging inner surfaces engaging said surfaces of the die, the die being separated into spaced segments slidable forward against said retaining member surfaces and sidable across the retaining member to index any die opening into alignment with said retaining member opening, means for holding the die in any of itis indexed positions, a holder for said sleeve means connected with the retaining member and having a barrel slidably receiving the sleeve means and having a cartridge chamber at the rear end of said means in communication therewith, said holder being adjustable for moving said cartridge chamber and retaining member toward and away from each other and being formed to push said sleeve means forward against said die to cause the die to grip the end of a pipe in one of the die openings, pipe-flaring means behind the die and normally spaced therefrom, a piston in said sleeve means behind said flaring means, and means associated with said cartridge chamber for firing a cartridge to drive the sleeve means and piston forward, the piston driving said flaring means forward to expand the end of the pipe into the flared end of the die opening containing the pipe.

12. A pipe flaring tool according to claim 11, in which said die holding means include a spring mounted in fixed position and spring-receiving notches in the die.

References Cited in the file of this patent

UNITED STATES PATENTS

| | | |
|---|---|---|
| 1,754,637 | McGough | Apr. 15, 1930 |
| 2,132,947 | Gagne | Oct. 11, 1938 |
| 2,141,098 | Wahlstrom | Dec. 20, 1938 |
| 2,221,228 | Maupin | Nov. 12, 1940 |
| 2,464,510 | Hull | Mar. 15, 1949 |
| 2,478,102 | Hull et al. | Aug. 2, 1949 |
| 2,563,088 | Wilks et al. | Aug. 7, 1951 |

FOREIGN PATENTS

| | | |
|---|---|---|
| 543,506 | Great Britain | Feb. 27, 1942 |
| 664,716 | Great Britain | Jan. 9, 1952 |